July 26, 1960 J. R. WALD, JR., ET AL 2,946,603
STEERING DEVICE FOR SURFACE MARKING APPARATUS
Filed March 6, 1958 4 Sheets-Sheet 1

INVENTORS
John R. Wald, Jr
Rufus W. Wilson
BY Karl W. Flocks
ATTORNEY

July 26, 1960 J. R. WALD, JR., ET AL 2,946,603
STEERING DEVICE FOR SURFACE MARKING APPARATUS
Filed March 6, 1958 4 Sheets-Sheet 3

INVENTORS
John R. Wald, Jr
Rufus W. Wilson.
BY Karl W. Flocks
ATTORNEY

July 26, 1960   J. R. WALD, JR., ET AL   2,946,603
STEERING DEVICE FOR SURFACE MARKING APPARATUS
Filed March 6, 1958   4 Sheets-Sheet 4
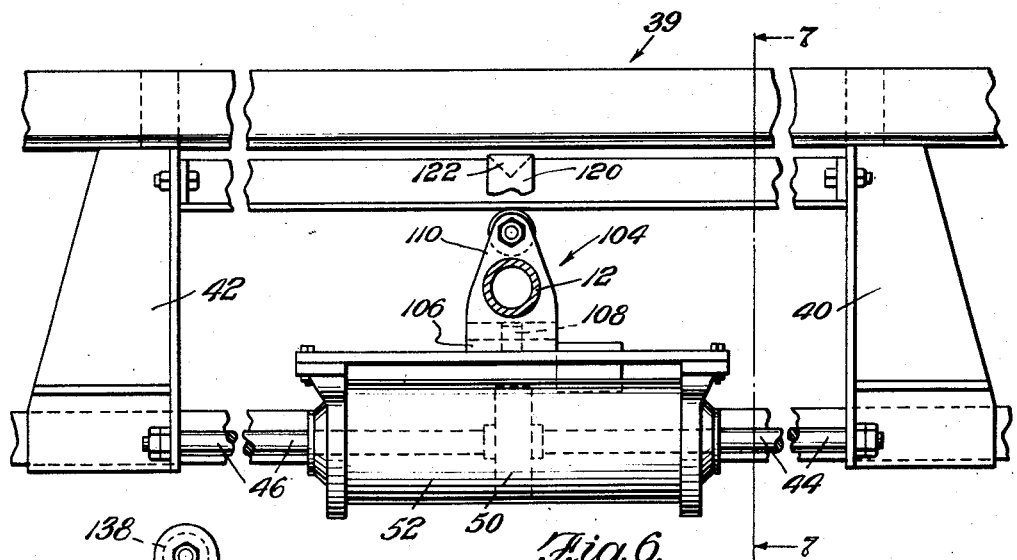
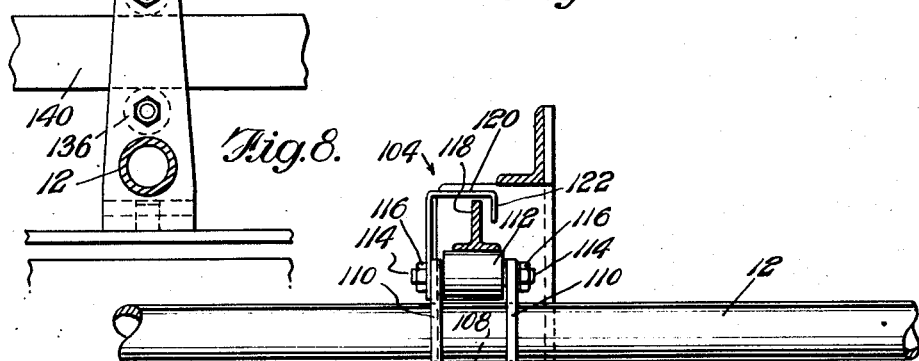
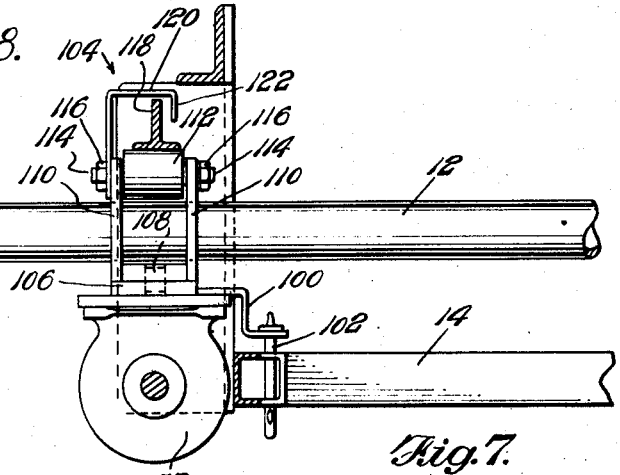
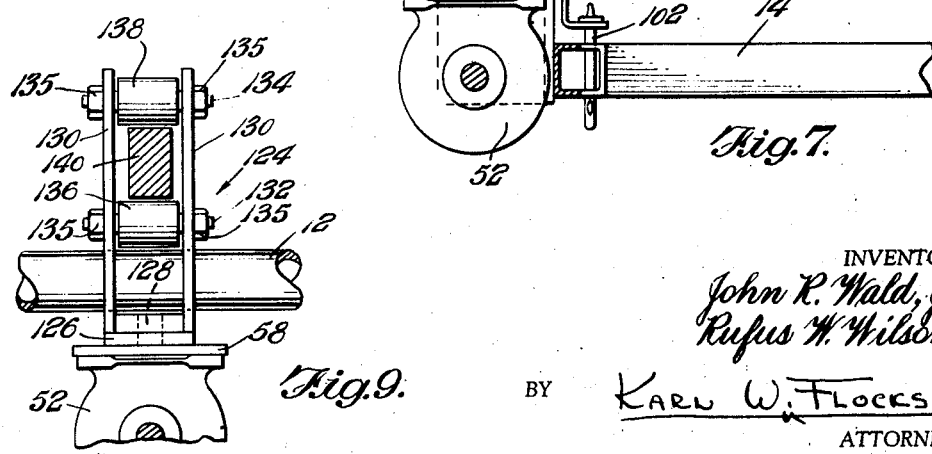
INVENTORS
John R. Wald, Jr.
Rufus W. Wilson.
BY Karl W. Flocks
ATTORNEY

United States Patent Office 2,946,603
Patented July 26, 1960

2,946,603
STEERING DEVICE FOR SURFACE MARKING APPARATUS

John R. Wald, Jr., Montoursville, and Rufus W. Wilson, Huntingdon, Pa., assignors to Wald Industries, Inc., Huntingdon, Pa., a corporation of Pennsylvania Filed Mar. 6, 1958, Ser. No. 719,679

11 Claims. (Cl. 280—463)

The present invention relates to apparatus for marking a surface. More particularly, the present invention relates to steering apparatus for use with a traffic line marking machine. This is a continuation-in-part of co-pending application Serial No. 515,462, filed June 14, 1955, and now patent #2,878,034, and entitled Steering Device for Surface Marking Apparatus.

In the art of applying traffic lines on highways, roads and the like, various types of devices have been employed heretofore ranging from the manually operated striper to the self-propelled and vehicle-towed striper. All of these heretofore known stripers were adapted to carry equipment that included means for generating a spray of paint and also were adapted to carry a paint gun for discharging the paint onto the surface to be marked. Prior to the instant invention, other apparatus in the form of a trailer towed by a vehicle was developed, the trailer being utilized in a two-fold manner, that is, for applying traffic lines on a highway by carrying the conventional striping equipment, and for storing traffic line guards that were adapted to be placed on the highway to protect newly applied lines and which were removed from the highway after the traffic lines had dried.

The present invention is designed to be utilized with the trailer-type striper and has application specification in the steering of the trailer to correctly apply the traffic line or to accurately retrace a previously applied line. Heretofore the trailer-type stripers were not provided with steering apparatus that enabled the operator to accurately follow a prescribed marking and thus considerable skill and cooperation between the driver of the vehicle towing the trailer and the trailer operator was necessary in order to successfully apply the traffic line in the correct manner.

It is therefore an object of the present invention to provide apparatus for marking a surface, wherein a trailer adapted to be towed by a vehicle along the surface of a road is provided with steering means for accurately following a prescribed line on the surface to be marked.

Another object of the present invention is to provide apparatus for marking a surface wherein pneumatically operated steering means is employed for controlling the movement of a striping machine whereby the striping machine is caused to accurately follow a prescribed line on the surface.

Still another object of the present invention is to provide a pneumatic steering means for surface marking apparatus which includes an air cylinder having a double acting piston positioned therein, the relative movement of the piston and cylinder being adapted to control the direction of travel of the surface marking apparatus.

Still another object is to provide a pneumatic steering device for a trailer wherein a cylinder is movable with respect to the piston positioned therein, the piston being fixed to the frame of the trailer and the cylinder being operatively connected to the trailer tongue.

Other objects and the nature and advantages of the instant invention will be apparent from the following description taken in conjunction with the accompanying drawings wherein:

Fig. 6 is a front elevational view of a modified form of the steering apparatus embodied herein, the trailer tongue being shown in section;

Fig. 7 is a vertical sectional view taken along lines 7—7 in Fig. 6.

Fig. 8 is a partial front elevational view of still another modified form of the steering device, the trailer tongue being shown in section; and Fig. 9 is a sectional view similar to Fig. 7 of the device shown in Fig. 8.

Figure 1:
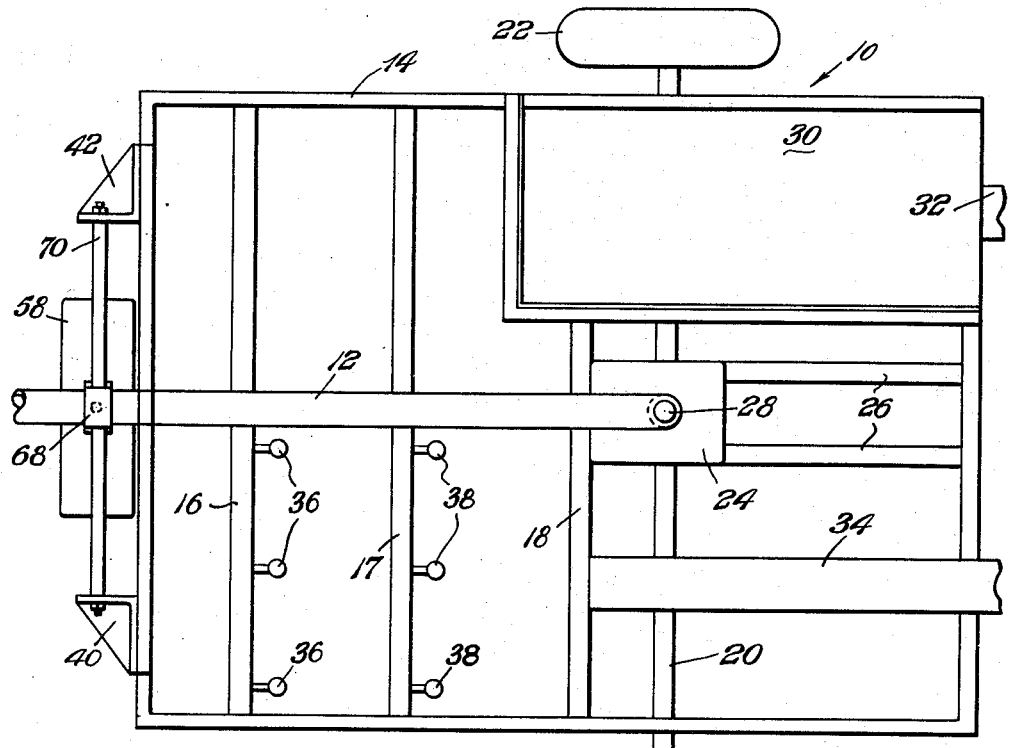
Fig. 1 is a plan view of a trailer that is adapted to carry road striping apparatus and that is secured to a forwardly positioned towing vehicle, one form of the steering apparatus embodied herein being mounted on the forward end of the trailer.

Referring now to the drawings and particularly Figs. 1–5, one form of the present invention is illustrated and includes a trailer generally indicated at 10, the trailer 10 being adapted to be connected to the rear end of a towing vehicle. The trailer 10 which is adapted to carry apparatus for applying traffic markings is pivotally mounted on a longitudinally extending tongue 12, the tongue 12 being suitably secured to the rear end of the towing vehicle. As shown in Fig. 1, the trailer 10 includes a generally rectangularly shaped frame 14 that is provided with cross members 16, 17 and 18. Suitably mounted on the frame 14 is an axle 20 which has wheels 22 rotatably secured to the outermost ends thereof. In order to pivotally secure the tongue 12 to the trailer 10, a block 24 is provided, being secured to the axle 20 and structural members 26, and pivotally receiving the end of the tongue 12 at 28.

Mounted on the rear of the frame 14 and engaging the cross member 18 is a hopper 30 that is adapted to receive traffic line guards therein, the guards being of the kind that are placed on the road to protect freshly applied traffic lines. A seat (not shown) is secured to the rear of the frame 14 and extends outwardly therefrom, being secured to a bracket 32.

It is seen that after a traffic stripe has been applied to a road, an operator occupying the seat secured to the bracket 32 may either place line guards on the stripe for protection, removing the guards from the hopper 30, or recover the guards from the road, placing them in the hopper 30. Also secured to the frame 14 and extending rearwardly therefrom is a bracket 34 to which is secured a second seat (not shown). The second seat is adapted to be occupied by the operator of the steering apparatus during the striping operation, the steering apparatus being described in detail hereinbelow.

In order to apply the traffic line stripe to the surface to be marked, the cross members 16 and 17 are provided with brackets (not shown) that are adapted to have secured thereto paint guns indicated diagrammatically at 36 and glass sphere dispensers indicated diagrammatically at 38. As shown in Fig. 1, the trailer 10 is equipped with three paint guns 36 and three sphere dispensers 38, but it is understood that as many of these units as desired may be mounted on the frame 14 of the trailer. In operation of the device, the paint guns 36 are supplied with a paint material under pressure from apparatus that is mounted on the towing vehicle, the paint guns 36 and sphere dispensers 38 cooperating to spray an autocollimating type of marking or stripe onto a highway or road.

Mounted on the front end of the frame 14 is a steering assembly generally indicated at 39 that includes L-shaped brackets 40 and 42, the base of the brackets being triangular in configuration as seen in the plan view in Fig. 1. It is understood that the brackets 40, 42 may be of any desired configuration provided that a flat surface is formed on the inner side thereof parallel to the longitudinal axis of the trailer frame 14. As shown in Fig. 3, piston rods 44, 46 are secured by nuts 48 to the lower ends of the brackets 40, 42 respectively, the inner ends of the piston rods 44, 46 being connected to a double-acting piston 50 (Fig. 2) positioned with a cylinder 52. Secured to the ends of the cylinder 52 are cylinder brackets 54, 56 on which is mounted a flat cylinder plate 58. Secured to the cylinder plate 58 and extending upwardly from substantially the midpoint of the upper surfaces thereof is a pintle 60, indicated in dotted lines in Figs. 3 and 4. Pivotally mounted on the pintle 60 is a pivot block construction generally indicated at 61. The pivot block construction 61 includes an octagonal shaped pivot block 62 that is formed with a depending portion 64, the depending portion 64 having a recess formed therein for receiving the pintle 60. The pivot block 62 is provided with a bore that slidably receives the trailer tongue 12 therein and this slidable movement of the pivot block on the trailer tongue will be more fully described hereinbelow. Integrally formed on the upper surface of the pivot block 62 and extending upwardly therefrom is a second pintle 66, the pintle 66 projecting into a recess formed in a slide block 68. The slide block 68 is provided with a bore that extends transverse to the longitudinal axis of the trailer tongue 12 and parallel to the piston rods 44, 46, the slide block being slidably mounted on a stabilizer or cross bar 70. The cross bar 70 is positioned directly above the piston rods 44, 46, being aligned in parallel relation therewith and being secured to the upper ends of the flat face of the brackets 40, 42 by nuts 72. It is seen that when air under pressure is introduced into the cylinder on either side of the piston 50, the cylinder 52 will be caused to translate with respect to the fixed piston 50 thereby carrying the pivot block 62 and slide block 68 therewith. Since the trailer tongue 12 is connected to the towing vehicle it will remain fixed in position and in order for the trailer 10 to properly follow a predetermined path, determined by the traffic stripe being applied, the pivot block 62 will pivot with respect to the cylinder 52 and slide block 68 and will slide on the tongue 12. The trailer frame 14 fixed to the piston rods 44, 46 and cross bar 70 will thus be pivotally moved with respect to the tongue and will be steered in direction to properly follow a predetermined striping pattern.

Figure 2:
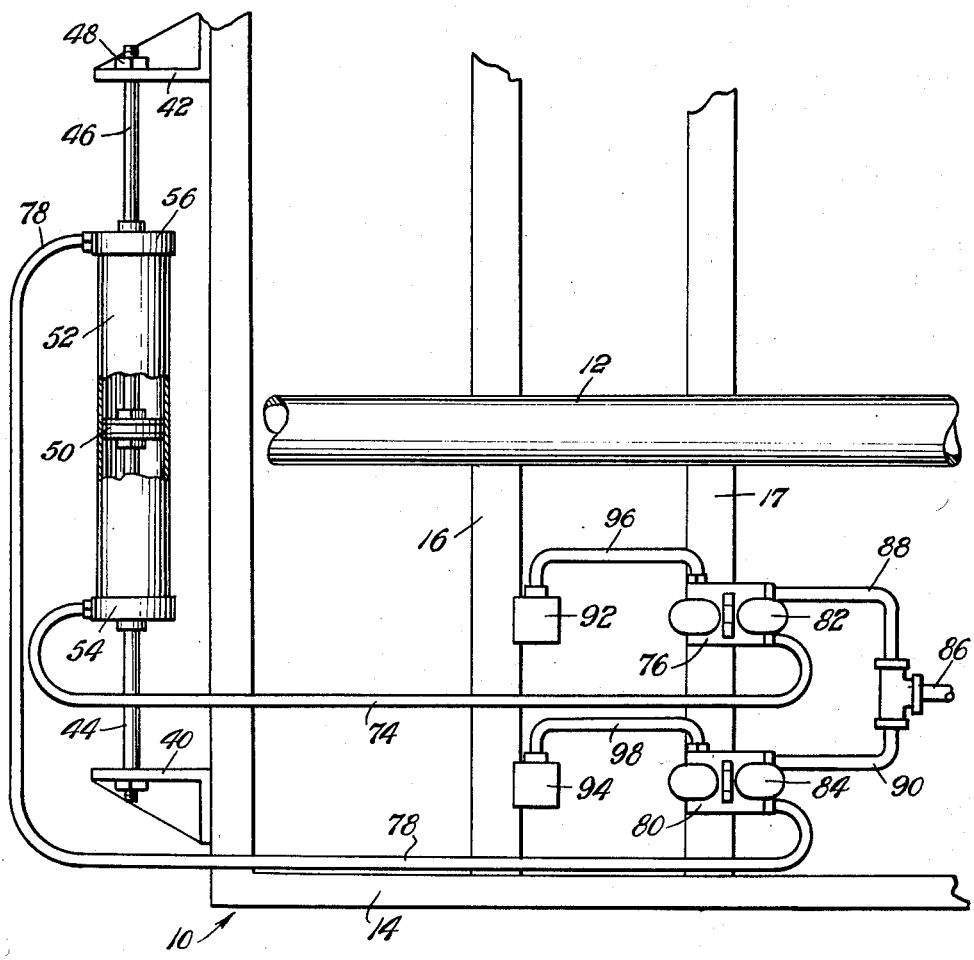
Fig. 2 is an enlarged view of the steering apparatus shown in Fig. 1, the top cylinder bracket being removed and the pneumatic control means being illustrated diagrammatically.
Figure 3:
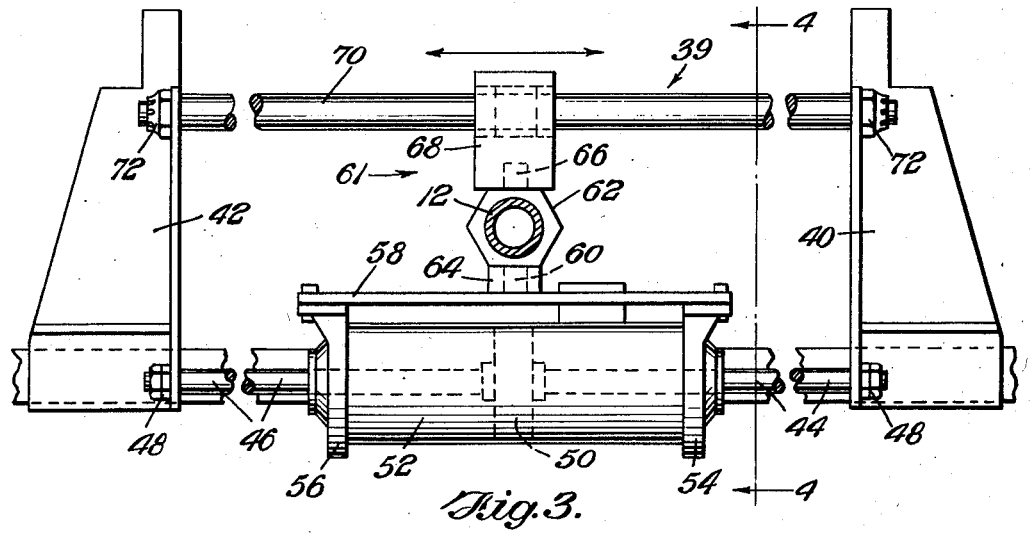
Fig. 3 is a front elevational view of the steering device shown in Fig. 1, the trailer tongue being shown in section.

Referring now to Fig. 2, the control means for the steering operation is diagrammatically illustrated and includes a pneumatically operated system. As described above the air cylinder 52 is pivotally connected to the tongue 12 through the pivot block 62, the piston rods 44, 46 being positively secured to the brackets 40, 42 respectively, and the cylinder 52 thereby being movable relative to the fixed piston 50 positioned therein. Extending through the end cylinder bracket 54 and into the lower end of the cylinder 52, as seen in Fig. 3, is an air conduit or line 74 that is operatively connected at the other end thereof to a three-way valve 76. Similarly, an air line 78 extends through the cylinder end bracket 56 and communicates with the interior of the cylinder 52 located upwardly of the piston 50 as seen in Fig. 2. The other end of the air line 78 is operatively connected to a three-way valve 80. The three-way valves 76 and 80 are controlled by foot pedals 82 and 84 respectively which are located adjacent the operator's seat and communicate with an air supply header 86 through air lines 88 and 90, respectively. It is understood that the steering operation may be carried out with the control system as described, however, in order to more closely control the steering of the trailer, the air exhausted from the cylinder 52 is controllably removed therefrom by providing regulated exhaust valves 92 and 94. The exhaust valves 92 and 94 communicate with the three-way valves 76 and 80 respectively through air lines 96 and 98 and air removed from either end of the cylinder 52 is exhausted through either three-way valve 76 or 80 and its associated exhaust valve. It is seen that the operator of the device may control the movement of the frame 14 and apply or retrace a paint stripe by simply controlling the valves 76 and 80 by the foot pedals 82 and 84. By depressing the foot pedal 82, air from the lower end of the cylinder as seen in Fig. 2 will be exhausted through the air line 74, valve 76, air line 96 and then through the regulated exhaust valve 92. The foot pedal 84 is depressed oppositely to allow air to be admitted to the valve 80 from the header 86 and into the air line 78. The cylinder 52 will then move upwardly as seen in Fig. 2 and will accordingly cause the frame 14 to pivot with respect to the tongue 12. The opposite movement of the cylinder 52 and the frame 14 may be effected by depressing the foot pedals 82 and 84 in the opposite direction, thereby providing exhaust of air through the valve 80 and entry of air through valve 76.

Figure 4:
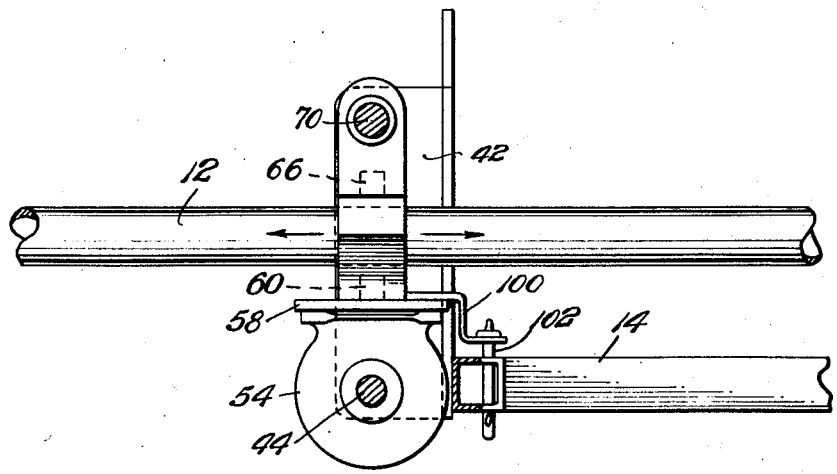
Fig. 4 is a vertical sectional view taken along line 4—4 in Fig. 3.

Referring to Fig. 4 a lock construction is illustrated that is adapted to positively lock the cylinder 52 in the neutral position and is normally utilized when the apparatus is inoperative, such as for example when traveling to and from a working area. The lock construction includes a stepped bracket 100 that is secured to the midpoint of the plate 58 at the rear side thereof and is stepped downwardly having an opening formed in the lower end thereof. A lock pin 102 is adapted to extend through the opening in the lower step of the bracket and also extends through aligned openings formed in the adjacent forward portion of the frame 14. It is seen that when the lock pin 102 is placed in the openings in the bracket 100 and frame 14, the cylinder 52 will be prevented from moving and will be locked in the neutral position thereof.

In operation of the apparatus illustrated in Figs. 1–5, the operator is positioned in the seat located at the rear of the trailer frame 14 and connected to the bracket 34. Although it is understood that suitable hand controls may be provided, the foot controls illustrated in Fig. 2 are depressed by the operator to bring about the movement of the trailer 10 that will cause the striping equipment to follow a predetermined path. Since the trailer 10 is operatively connected to the rear of a towing vehicle through the tongue 12, it is pivotally movable with respect to the tongue to follow the prescribed path. During the striping operation, the operator of the towing vehicle drives the towing vehicle along the road to be marked, attempting to follow as best as possible a route that will enable the paint guns 36 and sphere dispensers 38 to follow prescribed lines indicated at a, b, c, in Fig. 5. However, since it is not possible for the trailer 10 to duplicate the exact route of the towing vehicle, the operator of the trailer must vary the position of the frame 14 with respect to the tongue 12 to thereby cause the paint guns 36 and sphere dispensers 38 to follow the prescribed lines a, b, c. In order to vary the position of the frame 14 with respect to the tongue 12, the operator of the trailer actuates or depresses the foot pedals 82 and 84 in the desired manner. It is understood, of course, that hand controlled apparatus could also be incorporated in the apparatus to control the movement of the cylinder 52 and frame 14. In carrying out the steering operation of the trailer illustrated in Figs. 1–5, the operator alternately depresses the foot pedals 82 and 84 to allow air under pressure to enter and exhaust from both sides of the piston 50 in the cylinder 52.

Figure 5:
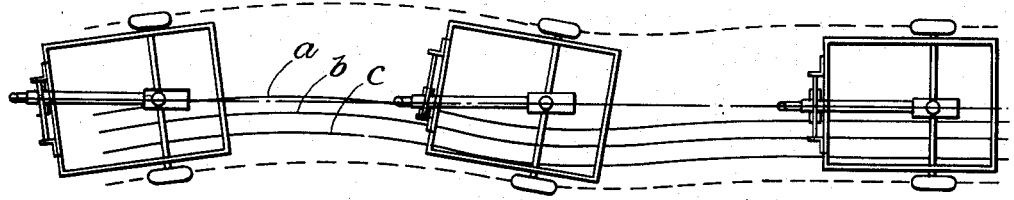
Fig. 5 is a diagrammatic illustration showing the steering movement of the trailer embodied herein during the road striping operation.

As illustrated diagrammatically in Fig. 5, the trailer 10 is steered by the judgment of the operator to cause the striping apparatus to follow a prescribed line. With reference being made to Fig. 5, the operation of the steering apparatus is as follows:

As seen in Fig. 5, the extreme right hand figure illustrates the trailer 10 following a substantially straight path. However, as the trailer 10 progresses toward the left, the prescribed lines a, b, c follow an undulated path which requires duplication by the paint guns 36 and sphere dispensers 38. In order to pivot the frame 14 upwardly as seen in Fig. 5, the operator depresses pedal 82 to open the valve 76 for communication with the main header 86 and conversely depresses the pedal 84 to provide for communication of the air line 78 with the exhaust conduit 98 and exhaust valve 94. Air is thus directed into the lower end of the cylinder as seen in Figs. 2 and 5 and expelled from the upper end thereof. The cylinder 52 then moves downwardly as seen in Fig. 2 with respect to the fixed piston 50. As the cylinder 52 moves to the right as seen in Fig. 3, the pivot block 62 and slide block 68 move therewith, the slide block 68 sliding on the cross bar 70. The pivot block in turn pivots on the pintles 60 and 66 and further slides with respect to the tongue 12. Since the front end of the tongue 12 is fixed to the towing vehicle, it follows that the frame 14 must pivot with respect to the tongue at the pivot point 28. The degree of pivotal movement of the frame 14 with respect to the tongue 12 can, of course, be controlled by the amount of air admitted to and exhausted from the cylinder 52. As the trailer moves to the left as seen in Fig. 5, the lines a, b, c slope to the left and accordingly the operator reverses the position of the pedals 82, 84 to cause the air line 78 to communicate with the main air header 86 and the air line 74 to communicate with the exhaust valve 92. The cylinder 52 then moves upwardly with respect to the fixed piston 50 as seen in Figs. 2 and 5, carrying the pivot block 62 and slide block 68 therewith. The pivot block slides on the tongue 12 and the frame 14 is thereby caused to be pivoted with respect to the tongue 12, the trailer 14 moving downwardly and to the left as seen in Fig. 5 to enable the spray guns and sphere dispensers to follow the prescribed lines a, b, c.

Referring now to Figs. 6 and 7, a modified form of the invention is illustrated and relates particularly to a modification of the slide and pivot block constructions. As shown in Fig. 6, the cylinder 52 and piston 50 are substantially the same as illustrated in Fig. 3, the cylinder 52 being movable with respect to the piston 50 that is fixed to the brackets 40 and 42 through the piston rods 44, 46. A pivot block generally indicated at 104 is mounted on the cylinder plate 58 and includes a base 106 that receives a pintle 108 extending upwardly from the plate 58. Joined to the base 106 are side plates 110 that are formed with aligned openings for slidably receiving the trailer tongue 12 therein. The side plates 110 are located in spaced relation and receive an anti-friction roller 112 therebetween, the roller 112 being rotatably mounted on a stub shaft 114 which is fixed to the plates by nuts 116. The roller 112 engages a T-shaped stabilizing cross bar 118 and is movable relative thereto, the T-shaped cross bar 118 being fixed to the end brackets 40, 42 by suitable bolts. It is seen that movement of the cylinder 52 with respect to the fixed piston 50 will cause the pivot block 104 to translate therewith, the anti-friction roller 112 rolling on the cross bar 118. Since the roller 112 rolls freely on the cross bar 118 the pivot block is able to pivot as the frame 14 is pivotally steered with respect to the tongue 12. The control apparatus for steering the trailer is identical to that described above and accordingly the operation of the modified form of the invention shown in Figs. 6 and 7 is similar to that described above in connection with Figs. 1–5.

In order to instantaneously determine the position of the cylinder 52 with respect to the frame 14 an indicating device is provided and as shown in Figs. 6 and 7 includes an indicator 120 that is secured to the roller stub shaft 114 by the forwardly positioned bolt 116. The indicator 120 extends upwardly from the forward side plate 110 and projects over the cross bar 118, terminating in a downwardly extending pointer 122. By providing the adjacent face of the cross bar 118 with indicia that is suitably calibrated, an instantaneous reading will be obtained as the cylinder 52 translates and thereby informs the operator of the position of the cylinder 52 with respect to the midpoint or neutral position of the frame.

Referring now to Figs. 8 and 9, a further modified form of the pivot block construction is illustrated and includes a pivot block generally indicated at 124. The pivot block 124 includes a base plate 126 that receives a pintle 128 projecting upwardly from the cylinder plate 58. Joined to the base plate 126 are side plates 130 that are located in spaced relation and have aligned openings formed therein for receiving the tongue 12.

Extending through the side plates 130 are spaced shafts 132 and 134, which are fixed to the plates 130 by nuts 135 and which have anti-friction rollers 136, 138 rotatably mounted thereon between the plates 130. Extending between the rollers 136, 138 in engaging relation therewith is a transverse stabilizing bar 140 which, as shown in Fig. 9, is rectangular in cross section. It is seen that during the steering operation cylinder 52 translates with respect to the piston 50 carrying the pivot block 124 therewith, the pivot block slidably moving on the stabilizing bar 140 by means of the anti-friction rollers that engage the bar 140.

It is further seen that the present invention provides an effective but simple device for controlling the movement of a towed trailer to cause paint guns and sphere dispensers mounted on the trailer to duplicate or trace a single or plurality of prescribed lines. Thus the trailer frame is pivoted with respect to the trailer tongue to accurately steer the trailer in the proper direction.

It will be obvious to those skilled in the art that various changes may be made without departing from the spirit of the invention and therefore the invention is not limited to what is shown in the drawings and described in the specification, but only as indicated in the appended claims.

What we claim is:

1. In apparatus for marking a surface, a longitudinally extending tongue adapted to be secured to the rear end of a towing vehicle, a frame mounted for pivotal movement on said tongue, a steering assembly mounted on the forward end of said frame and operatively engaging said tongue, said steering assembly including a cylinder, a piston located in said cylinder and fixed with respect thereto and said frame, the longitudinal axis of said piston and cylinder being normally perpendicular to the axis of said tongue, a pivot block mounted on said cylinder and slidable therewith, said pivot block receiving said tongue therein and pivotally mounted with respect to said cylinder, and means for translating said cylinder and pivot block with respect to said piston, the movement of said cylinder causing said frame to pivot with respect to the relatively fixed tongue, to vary the position of said frame with respect to said surface.

2. In apparatus for marking a surface, a longitudinally extending tongue adapted to be secured to the rear end of a towing vehicle, a frame mounted for pivotal movement on said tongue, a steering assembly mounted on the forward end of said frame and operatively engaging said tongue, said steering assembly including a piston fixed with respect to said frame, a cylinder movably positioned on said piston, pivot means mounted on said cylinder and movable therewith, said pivot means operatively engaging said tongue and slidable with respect thereto, and means operatively connected to said cylinder for translating said cylinder and pivot means with respect to said piston, the movement of said cylinder causing said frame to pivot with respect to the relatively fixed tongue, thereby varying the position of said frame with respect to said surface.

3. In apparatus for marking a surface, a fixed member, a frame mounted for pivotal movement on said fixed member, a steering assembly mounted on said frame for pivoting said frame with respect to said fixed member, said steering assembly including a piston, fixed with respect to said frame, a cylinder movably mounted on said piston, pivot means mounted on said cylinder and slidably engaging said fixed member, and control means operatively connected to said cylinder for translating said cylinder and pivot means with respect to said piston to cause relative movement of said frame with respect to said fixed member.

4. In apparatus for marking a surface as set forth in claim 3, said control means including a pair of three-way valves, each of which communicate with an exhaust valve and a main air supply header, and foot control means for controlling the position of said three-way valves, thereby controlling the position of said cylinder.

5. In apparatus for marking a surface, a longitudinally extending tongue adapted to be secured to the rear end of a towing vehicle, a frame mounted for pivotal movement on said tongue, a steering assembly mounted on the forward end of said frame and operatively engaging said tongue, said steering assembly including a piston fixed with respect to said frame, a cylinder movable on said piston, pivot means mounted on said cylinder and movable therewith, said pivot means operatively engaging said tongue and slidable with respect thereto, said pivot means including a pivot block and a slide block, said pivot block receiving said tongue therein and being pivotally mounted with respect to said cylinder, said slide block being mounted on a fixed stabilizing cross bar and laterally movable thereon with said pivot block and cylinder, and means operatively connected to said cylinder and controlling the movement thereof, the movement of said cylinder causing said frame to pivot with respect to the relatively fixed tongue, thereby varying the position of said frame with respect to said surface.

6. In apparatus for marking a surface, a longitudinally extending tongue adapted to be secured to the rear end of a towing vehicle, a frame mounted for pivotal movement on said tongue, a steering assembly mounted on the forward end of said frame and operatively engaging said tongue, said steering assembly including a piston fixed with respect to said frame, a cylinder movable on said piston, pivot means mounted on said cylinder and movable therewith, said pivot means operatively engaging said tongue and slidable with respect thereto, said pivot means including a pivot block and a roller engaging a fixed cross bar, said pivot block receiving said tongue therein and pivotally mounted on said cylinder, said pivot block and roller being laterally movable on said cross bar in response to movement of said cylinder, and means operatively connected to said cylinder and controlling the movement thereof, the movement of said cylinder causing said frame to pivot with respect to the relatively fixed tongue, thereby varying the position of said frame with respect to said surface.

7. In apparatus for marking a surface, a longitudinally extending tongue adapted to be secured to the rear end of a towing vehicle, a frame mounted for pivotal movement on said tongue, a steering assembly mounted on the forward end of said frame and operatively engaging said tongue, said steering assembly including a piston fixed with respect to said frame, a cylinder movable on said piston, pivot means mounted on said cylinder and movable therewith, said pivot means operatively engaging said tongue and slidable with respect thereto, said pivot means including a pivot block and a pair of spaced rollers engaging a fixed cross bar, said pivot block receiving said tongue therein and pivotally mounted on said cylinder, said pivot block and rollers being laterally movable on said cross bar in response to movement of said cylinder, and means operatively connected to said cylinder and controlling the movement thereof, the movement of said cylinder causing said frame to pivot with respect to the relatively fixed tongue, thereby varying the position of said frame with respect to said surface.

8. In apparatus for marking a surface, a fixed member, a frame mounted for pivotal movement on said fixed member, a steering assembly mounted on said frame for pivoting said frame with respect to said fixed member, said steering assembly including a piston, fixed with respect to said frame, a cylinder movable on said piston, and pivot means mounted on said cylinder and slidably engaging said fixed member, said last named means including a pivot block mounted on said cylinder and pivotal with respect thereto, said pivot block slidably receiving said fixed member through an opening formed therein and movable with said cylinder to cause said frame to move relatively to said fixed member.

9. In apparatus for marking a surface, a longitudinally extending tongue adapted to be fixed to the rear end of a towing vehicle, a frame mounted for pivotal movement on said tongue, a steering assembly mounted on said frame for pivoting said frame with respect to said tongue and thereby steering said frame on said surface, said steering assembly including a member fixed to said frame and a member mounted on said fixed member and movable relative thereto, said movable member being normally centrally located with respect to said frame, said fixed member being defined by a piston secured to said frame by piston rods, and said movable member being defined by a cylinder and a pivot block construction secured to said cylinder and movable therewith, said pivot block construction receiving said tongue therein and including a slide block, said slide block being movable on a rigid stabilizing cross bar that is located in parallel relation with respect to said piston rods, and means operatively connected to said movable member for controlling the movement thereof so as to move said movable member to either side of the central location thereof, thereby varying the position of said frame with respect to said tongue.

10. In apparatus for marking a surface, a longitudinally extending tongue adapted to be fixed to the rear end of a towing vehicle, a frame mounted for pivotal movement on said tongue, a steering assembly mounted on said frame for pivoting said frame with respect to said tongue and thereby steering said frame on said surface, said steering assembly including a member fixed to said frame and a member mounted on said fixed member and movable relative thereto, said movable member being normally centrally located with respect to said frame, said fixed member being defined by a piston secured to said frame by piston rods and said movable member being defined by a cylinder and a pivot block construction secured to said cylinder and movable therewith, said pivot block construction including at least one roller that engages a transverse stabilizing cross bar, said stabilizing cross bar being fixed to said frame and located in parallel relation with respect to said piston rods, and means operatively connected to said movable member for controlling the movement thereof so as to move said movable member to either side of the central location thereof, thereby varying the position of said frame with respect to said tongue.

11. In apparatus for marking a surface as set forth in claim 10 wherein said pivot block construction includes a pair of rollers that engage said stabilizing cross bar, thereby providing for relatively free lateral movement of said cylinder during the steering operation.

References Cited in the file of this patent

UNITED STATES PATENTS

| | | |
|---|---|---|
| 859,235 | Macfarren | July 9, 1907 |
| 918,161 | Jonas | Apr. 13, 1909 |
| 1,391,760 | Collier | Sept. 27, 1921 |
| 1,908,095 | York et al. | May 9, 1933 |
| 2,015,695 | Sapp | Oct. 1, 1935 |